No. 725,584. PATENTED APR. 14, 1903.
E. POCHER.
STOP LATCH FOR ELEVATOR CAGES.
APPLICATION FILED JUNE 16, 1902.
NO MODEL.
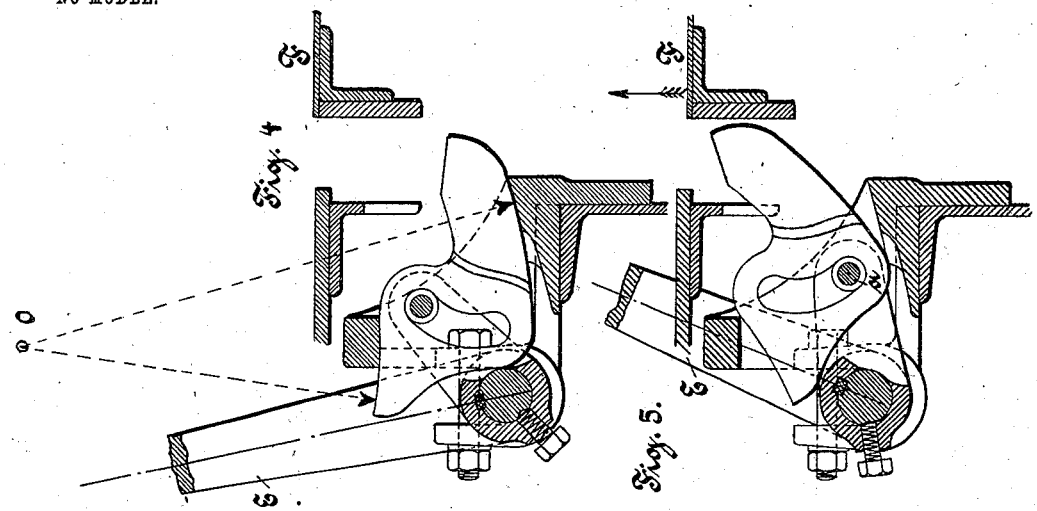
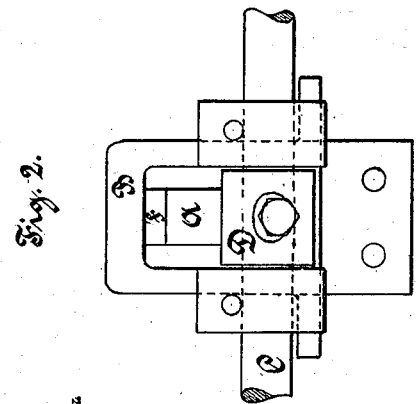
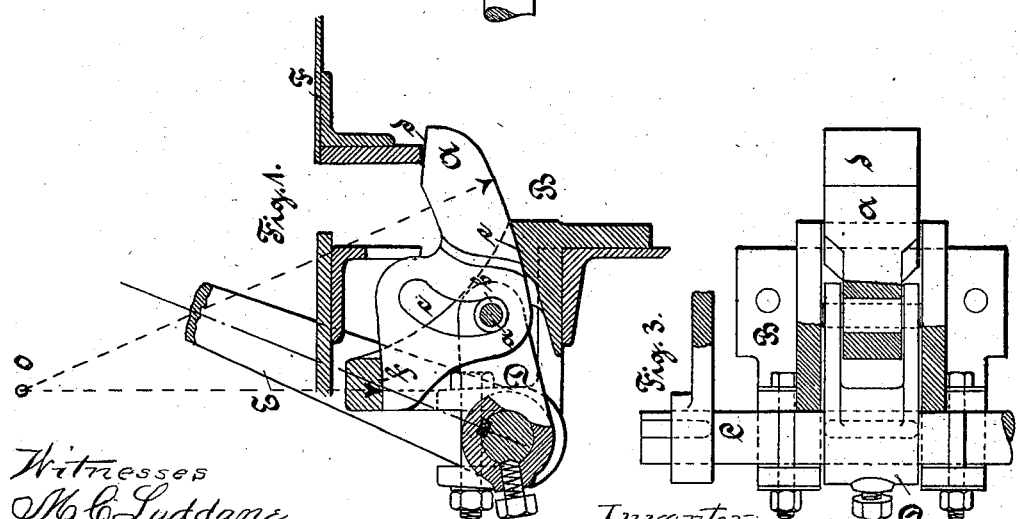
Witnesses
M. C. Lyddane
M. Roy.
Inventor
Edmund Pocher by G. Dittmar
Attorney

UNITED STATES PATENT OFFICE.

EDMUND POCHER, OF HERNE, GERMANY.

STOP-LATCH FOR ELEVATOR-CAGES.

SPECIFICATION forming part of Letters Patent No. 725,584, dated April 14, 1903.

Application filed June 16, 1902. Serial No. 111,876. (No model.)

*To all whom it may concern:*

Be it known that I, EDMUND POCHER, a citizen of the German Empire, and a resident of Herne, Westphalia, Germany, have invented certain new and useful Improvements in Stop-Latches for Elevator-Cages, of which the following is a specification.

My invention relates to stop-latches for the cages of elevators and hoisting machinery, the object being to provide a device of this character applicable to any cage which shall be extremely simple in construction and safe in operation.

With this object in view the invention consists in the improved construction, arrangement, and combination of parts hereinafter fully described and afterward specifically claimed.

In the accompanying drawings, in which is illustrated one embodiment of my invention, Figure 1 represents a vertical sectional view showing the latch-block in advance position with the cage resting thereon. Fig. 2 represents the device in side elevation. Fig. 3 represents a view, partly in plan and partly in horizontal section. Fig. 4 represents a vertical sectional view with the latch-block retracted or in position to permit the downward movement of the cage. Fig. 5 represents a similar view showing the latch-block tipped over by the cage when the latter is moved upward with the latch-block advanced.

Referring to the drawings by letters, B is a casing to the rear of which in suitable bearings is mounted a shaft C, upon which is secured a double radial arm D, which extends into the casing B and carries at its free end a bolt $a$ with a friction-roller $b$ thereon, said roller being mounted in a curved slot $c$ in the latch-block A, the latter being free to move forward and backward and to tilt on roller $b$, the limit of its forward movement being when its upper rear surface contacts with the surface $f$ of the casing and its forward lower surface with the surface $e$ thereof, the latch-block in such a position, as shown in Fig. 1, being advanced to a position in the path of the elevator-cage F, which will rest on and be held by the surface $d$, in which position little or no strain is brought upon the roller $b$ or arm D, the surfaces $e$ and $f$ serving to take nearly all of the strain. When the arm D is moved upward by turning the shaft C, the latch-block will be easily moved backward or retracted to the position shown in Fig. 4, the surfaces $e$ and $f$ being curved in arcs of circles having a common center at $o$. Should the cage F be raised when the latch-block is advanced, the latter will trip upward on the roller $b$, as seen in Fig. 5, permitting the cage to pass, the latch-block, by virtue of the gravity of its forward end, dropping after the cage has passed into the position shown in Fig. 1, ready to support the cage when it again descends.

Having thus fully described my invention, what I claim as new, and desire to secure by Letters Patent of the United States, is—

In stop-latches for elevators, the combination with a casing having openings in its front and rear faces a slotted latch-block in the casing provided with surfaces adapted to contact with the lower wall of the front opening and the upper wall of the rear opening of the casing when the latch-block is advanced into operative position but free to tip upward, a shaft journaled at one side of the casing, an arm on the shaft, projecting into the casing, a pin on the arm projecting into the slot of the latch-block and means for rocking the shaft, substantially as described.

In witness whereof I have hereunto subscribed my name in the presence of two witnesses.

EDMUND POCHER.

Witnesses:
 WILLIAM ESSENWEIN,
 PETER LIEBER.